(12) United States Patent
Walker

(10) Patent No.: US 10,517,438 B2
(45) Date of Patent: Dec. 31, 2019

(54) EXTRACTION BREWER

(71) Applicant: Trent Walker, West Orange, NJ (US)

(72) Inventor: Trent Walker, West Orange, NJ (US)

( * ) Notice: Subject to any disclaimer, the term of this patent is extended or adjusted under 35 U.S.C. 154(b) by 503 days.

(21) Appl. No.: 15/332,899

(22) Filed: Oct. 24, 2016

(65) Prior Publication Data

US 2017/0119201 A1    May 4, 2017

Related U.S. Application Data

(60) Provisional application No. 62/247,612, filed on Oct. 28, 2015.

(51) Int. Cl.
| | | |
|---|---|---|
| *A47J 43/046* | (2006.01) | |
| *A47J 43/06* | (2006.01) | |
| *A47J 43/08* | (2006.01) | |
| *A47J 31/56* | (2006.01) | |

(52) U.S. Cl.
CPC .......... *A47J 43/0465* (2013.01); *A47J 31/56* (2013.01)

(58) Field of Classification Search
CPC .... A47J 36/16–165; A47J 43/046–0465; A47J 43/06; A47J 43/0766; A47J 43/0722; A47J 43/08–087; H05B 1/0258–0261; H05B 3/68–686; H05B 6/12–1236
See application file for complete search history.

(56) References Cited

U.S. PATENT DOCUMENTS

| | | | |
|---|---|---|---|
| 1,242,493 A | 10/1917 | Stringham | |
| 1,420,774 A * | 6/1922 | Stainbrook | ......... A47J 43/0465 |
| | | | 366/274 |
| 3,417,972 A * | 12/1968 | Vincent | ................. A47J 43/046 |
| | | | 241/199.12 |
| 4,162,855 A | 7/1979 | Bender | |
| 4,450,076 A * | 5/1984 | Medicus | ............... B01D 61/28 |
| | | | 210/242.1 |
| 4,465,377 A * | 8/1984 | de Bruyne | ......... B01F 13/0818 |
| | | | 366/273 |
| 4,523,720 A * | 6/1985 | Behringer | ............... B26D 1/29 |
| | | | 241/282.1 |
| 6,733,171 B2 | 5/2004 | Schob | |
| 7,318,375 B2 * | 1/2008 | Huang | ............... A47J 43/0777 |
| | | | 366/205 |

(Continued)

FOREIGN PATENT DOCUMENTS

| | | |
|---|---|---|
| CN | 204363655 U | 6/2015 |
| CN | 204445567 U | 7/2015 |
| GB | 2505659 A | 12/2014 |

*Primary Examiner* — Michael A Laflame, Jr.
(74) *Attorney, Agent, or Firm* — Michael J. Brown

(57) ABSTRACT

An electric heating and stirring machine that heats and stirs a substance or substances placed in a carafe for brewing coffee, tea, or extracting substances into fats or oils. The device uses a motor to rotate a magnet holder upon which magnets are mounted. The rotation of the magnets magnetically rotates a stirrer, through attraction to the rotating magnets, rotation of the stirrer stirs the contents of the carafe. The contents of the carafe are heated, preferably by an infrared or induction heater located below the carafe. The base of the stirrer is heated via induction or direct infrared heat. The temperature of the substance in the carafe is measured by a thermometer. A control circuit can be used to control the speed of mixing, the temperature, and the time of both stirring and heating.

17 Claims, 6 Drawing Sheets

(56) References Cited

U.S. PATENT DOCUMENTS

| | | | | |
|---|---|---|---|---|
| 8,459,862 B2* | 6/2013 | Oouchi | ............... | G01N 27/453 |
| | | | | 366/273 |
| 8,887,628 B2* | 11/2014 | Cai | ...................... | A47J 43/046 |
| | | | | 366/273 |
| 9,801,500 B2* | 10/2017 | Ven Der Woning | ........................ | |
| | | | | A47J 43/0465 |
| 2003/0099154 A1* | 5/2003 | Daniels, Jr. | ............ | A47J 43/042 |
| | | | | 366/191 |
| 2007/0122516 A1* | 5/2007 | Qian | ...................... | A21C 9/066 |
| | | | | 425/200 |
| 2008/0257168 A1* | 10/2008 | Wolfe | .................... | A47J 36/165 |
| | | | | 99/348 |
| 2013/0081545 A1* | 4/2013 | Thai | .................... | A47J 43/0716 |
| | | | | 99/466 |
| 2014/0348987 A1* | 11/2014 | Cheng | ..................... | A47J 27/04 |
| | | | | 426/231 |
| 2015/0027319 A1* | 1/2015 | Wu | ........................ | A47J 27/10 |
| | | | | 99/330 |
| 2015/0335204 A1* | 11/2015 | Palmer | ................. | B01F 9/0001 |
| | | | | 99/348 |
| 2016/0073820 A1* | 3/2016 | Alet Vidal | ............ | A47J 36/165 |
| | | | | 99/337 |
| 2017/0280914 A1* | 10/2017 | Kumar | .................... | A47J 27/62 |
| 2018/0160855 A1* | 6/2018 | Krivos | ................ | A47J 43/0761 |
| 2018/0243766 A1* | 8/2018 | Perrin | .................... | A47J 43/046 |

* cited by examiner

EXTRACTION BREWER

This application claims priority from U.S. provisional patent application No. 62/247,612, filed Oct. 28, 2015.

FIELD OF INVENTION

This invention generally relates to an electric, heating and stirring brewing device and, more particularly, to a device use for brewing such things as coffee, brewing tea, or extracting substances into oils or fats in a way that uses automated stirring and heating to provide complete control over the brewing process for the operator. It is also the case that one variant of this invention relying on induction heating is also valuable as a general apparatus.

BACKGROUND

There are a number of ways to brew coffee or tea, and a number of ways to extract substances into fats or oils. The French press coffee machine is one such machine which is widely used today.

In a French press coffee maker, dry coffee grounds are placed into a carafe and then water is heated in a separate device and then added to the grounds. The coffee brews statically or the coffee can also be manually stirred while brewing. After the brewing is complete, the coffee grounds are filtered out and the beverage is served. Similarly, tea leaves can be placed in a carafe and the above process repeated for brewing tea or, one can use any food substance (herbs, etc.) and any liquid, including oils or fats such as butter to extract flavors from the food substance into the liquid.

Traditionally, when using a French press for coffee or tea, the process is usually manual requiring the operator to manually stir and availability to a separate kettle with which water can be heated. Moreover, water temperature begins dropping quickly once in the French press thereby quickly removing the coffee grounds from a temperature where the operator may feel optimal extraction can occur. Since the process is manual with a French press, the operator must also gauge the time to stir and when to serve, a process that is open for errors in timing and could cause the operator to over or under extract the coffee, tea, or other brewed liquid. It is also the case that after pouring a single serving from a French press, the remaining coffee in the French press quickly cools as there is no heating device to keep the temperature stable and at an optimal serving temperature.

Tea brewing is an ancient art incorporating multiple different methods for controlling the temperature of the water against the tea leaves. While many people think the variety of tea pots that have been created are for visual appeal, it is actually the case that certain teas are designed for certain pots because of the thermal properties of such pots. However, even with this thoughtful design, the ability to use materials and shape to fully control a thermal profile is limited at best. The manual process of tea brewing means that the full capability of perfecting a thermal profile for a particular type of tea is generally beyond the ability of the traditional static process.

This invention also is impactful to the brewing of cold brew coffee. Cold brew coffee brews around room temperature for extended periods of time, in many cases up to 24 hours. Usually, the operator has little control over the temperature of the brewing temperature and stirring for ordinary consumers is manual. Ideally, the operator would be able to slightly heat the cold brewed coffee in order to quicken the extraction process; however, because of brewing at ambient temperatures, this leads to extended times. Brewing of cold brewed coffee varies depending upon the ambient temperature and also the extended time to extract coffee from a statically brewed environment. The operator must also remember the time when he or she began brewing the coffee and given the extended time periods this can easily create operator error.

This invention is also impact for extraction of substances into oils and fats. Currently, to infuse flavors into oils or fats, the process is often done statically or by using crude equipment such as crock pots or low powered burners. As an example, in parts of the country where marijuana is legal, marijuana is often infused into butter for use in baking via a long steep in crock pots. This statically brewed process can lead to clumping of the marijuana because of the static brewing process. Manual stirring can help the process but requires attention of the operator and can be prone to operator error. Also, because timing is extended, it requires the operator to remember the time in order to avoid over or under extraction and the creation of a consistent product.

There are inventions which combine temperature measurement, magnetic stirring, and infrared diode heating for laboratory experiments involving fluids. These laboratory devices are relatively uncommon have never transferred into the area of food preparation nor have they ever been used for coffee, tea, or other brewing usages. There are no prior art devices which use induction heating as the heating mechanism for the fluid. This is a significant advantage since induction heating is vastly more efficient than infrared heating and hence the new invention represents a significant leap forward for the efficiency of the heating step.

It is therefore the objective of the present invention to create an automatic brewing device that allows for brewing coffee, tea, other warm beverages requiring heating and mixing, or extracting oils in a French press-like carafe but which overcomes the disadvantages of manual stirring and lack of precise temperature control along with the ability to add precise timing to the stirring and heating in order to enhance the operators knowledge of the time spent brewing and minimize failures of timing.

SUMMARY OF THE INVENTION

The invention combines heating, preferably induction heating, with magnetically driven stirring. The operator will place the substances to be brewed, for example coffee grounds and cold water, into a carafe containing the stirrer. The carafe is placed onto a base which includes a heater and moveable magnets. The stirrer is attracted to rotating magnets which spin around outside of the carafe, thereby spinning the stirrer. Underneath the carafe is a heater which heats the carafe, either directly or indirectly. This heating causes the fluid in the carafe to heat. The stirrer, while rotating and depending upon the fluid being stirred, may have openings in the bottom of the stirrer to aid in heat distribution and fluid mixing as well as may come in a variety of shapes designed for both better heating, mixing, or for design purposes.

The operation of the machine can be roughly described by the example of brewing hot coffee. In this example, one places a stirrer in the bottom of a carafe, such as a traditional French press container, and then adds water and ground coffee. The carafe is then placed on the base of the invention. The machine is activated and the stirrer begins rotating at a desired speed, driven by magnetism. The coffee is heated to brewing temperature, which can vary over time, perhaps starting at one temperature and then lowering to another temperature to gain the desired brewing effect. In this illustrative example, we will assume that the operator wants stirring to continue throughout the brewing cycle and hence one brewing is completed, the stirring stops and the heating can stop or continue in order to keep the coffee warm.

Achievement of the objective of the invention is partly acquired by controls that allow the operator to set the temperature, duration, and speed of spinning of the brewing process. Once brewing stops, a warming cycle may ensue which will allow the operator to keep the fluid at an appropriate serving temperature. Certain models of the invention may incorporate advanced controls which allow for multiple phases of heating and/or stirring, as well as the capacity to set predefined temperature curves which precisely control temperature and how temperature could change over time. This is especially helpful in the brewing of teas as being able to set a specific thermal profile and have the machine execute precise temperatures at precise times gives a great degree of control to the operator.

DETAILED DESCRIPTION OF THE PREFERRED EMBODIMENT

Figure 1:
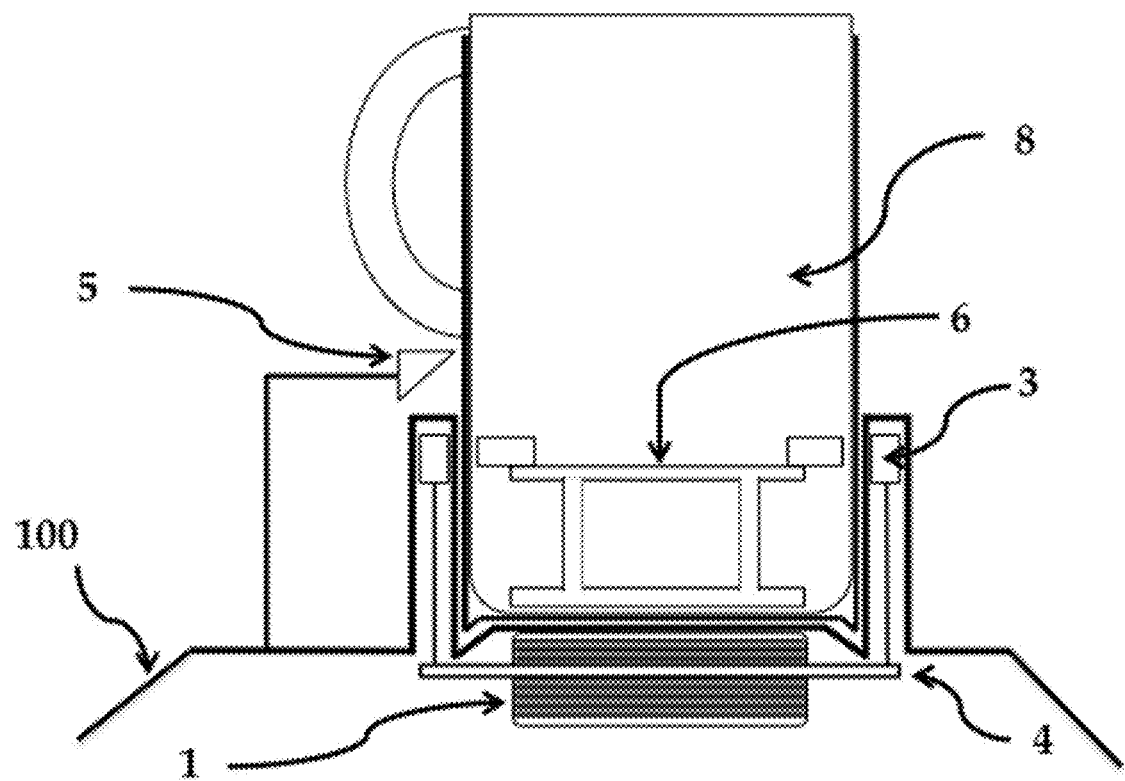
FIG. 1 is a cross section side view of a preferred embodiment of the invention.

The invention preferably consists of a base 100, carafe 8 and removable stirrer 6. Base 100 is comprised of heater 1, rotating magnet holder 4, and motor 2. Thermometer 5 may be added to base 100.

Heater 1 is preferably an induction heater, but may be an infrared or coil heater as are known in the art. Heater 1 provides controlled heating to carafe 8, and induction heating is preferred as it provides heating to one or more specific components for efficient heating.

Rotating magnet holder 4 is preferably circular with a central axis of rotation, but eccentric rotation may also be used. Rotating magnet holder 4 supports magnets 3 and is driven by motor 2. Motor 2 may be any type of motor drive as is known in the art, and may drive rotating magnet holder 4 by a belt drive, chain drive, gears or other known mechanism.

Magnets 3 are shown in FIG. 1 elevated with respect to rotating magnet holder 4. Magnets 3 are preferably positioned relative to carafe 8, and more particularly with respect to stirrer 6 to provide optimal magnetic fields for moving stirrer 6.

Figure 4:
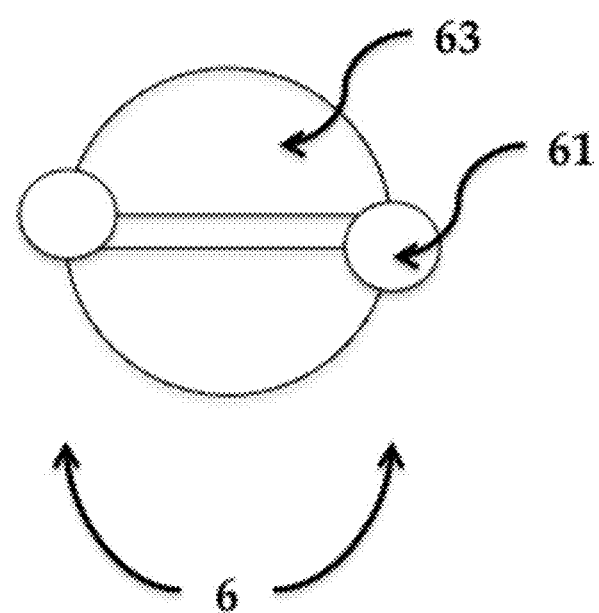
FIG. 4 is a top view of a particular stirrer with potential openings in the base.
Figure 5:
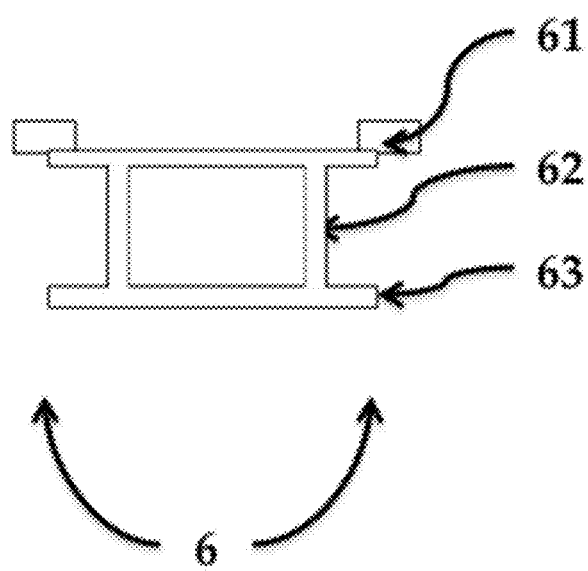
FIG. 5 is a side view of a particular stirrer.
Figure 6:
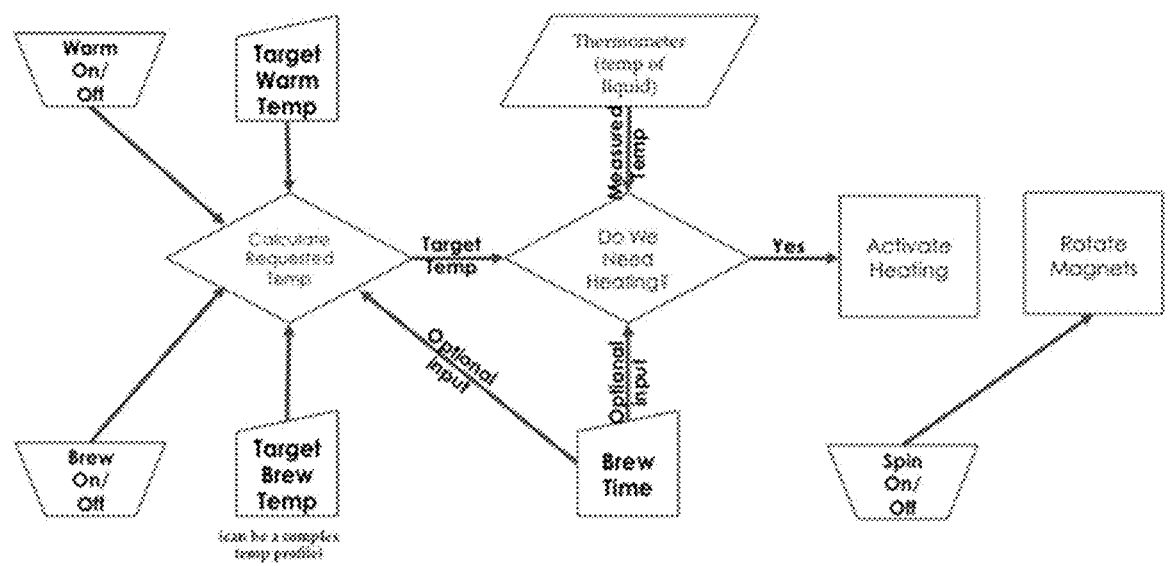
FIG. 6 is a logic flow chart of the operations software employed for operating the controller.

Stirrer 6 is removably placed within carafe 8. As shown in FIG. 4, stirrer 6 is comprised of a stirrer base 63 and magnetically attracted blocks 61. Blocks 61 are preferably elevated with respect to stirrer base 63, as shown in FIGS. 1 and 6, by stirrer lift 62. Blocks 61 are magnetically attracted to magnets 3, where the rotation of magnets 3 imparts rotational movement to blocks 61 and stirrer 6.

Stirrer lifts 62 may be formed into any of a variety of shapes, and can be formed as vanes to assist in stirring the contents of carafe 8.

Where induction heating is used, stirrer lifts 62 are of sufficient height to move blocks 61 away from the induction heating field. In the case of induction heating, Foucault currents are generated in the stirrer base 63, thereby heating stirrer base 63 and hence heating the contents of carafe 8. The rotating magnets 3 and the attraction blocks 61 on the stirrer 6 are elevated above stirrer base 63 in order to minimize the effects of the Foucault currents on magnets 3. As induction heating creates heat within electrically conductive material, the induction field may affect the magnetic characteristics of magnets 3, and the separation provided by stirrer lifts 62 serves to prevent the induction field from affecting magnets 3.

The invention may also comprise a control circuit 70 capable of monitoring and adjusting one or more of the temperature of heater 1, the speed of motor 2, the rotation of magnets 3, as well as the time of the operation of any of the foregoing. Such a control circuit would be embodied in a microprocessor and software or firmware as is known in the art, and could follow the logic flow diagram of FIG. 6. The control circuit could also include a display capable of showing the temperature, speed and time, as well as control buttons for a operator to program the control circuit. Control circuit 70 would allow an operator to the program or pre-set at least one of a desired temperature, stirring rotation speed and time of operation. The operator may select an ideal temperature profile for brewing and/or warming which can include bounds on time for brewing/warming, and activates the machine.

Referring to FIG. 1, the stirrer 6 is placed into the carafe 8. Ground coffee and water are also added to the carafe 8 and the carafe 8 is placed on base 100 above the heater 1.

If the operator has chosen to activate the spin motion, motor 2 drives magnet holder 4 upon which magnets 3 are mounted, preferably in rotating manner. These magnets 3 attract blocks 61 on the stirrer 6 and cause the stirrer 6 to begin spinning, thereby mixing the coffee grounds and water. While the stirrer 6 detailed is shown to be in a particular configuration, many shapes with a base and raised elements attracted to magnetism could be created. Stirrer 6 may also be an integrated component of carafe 8.

Figure 2:
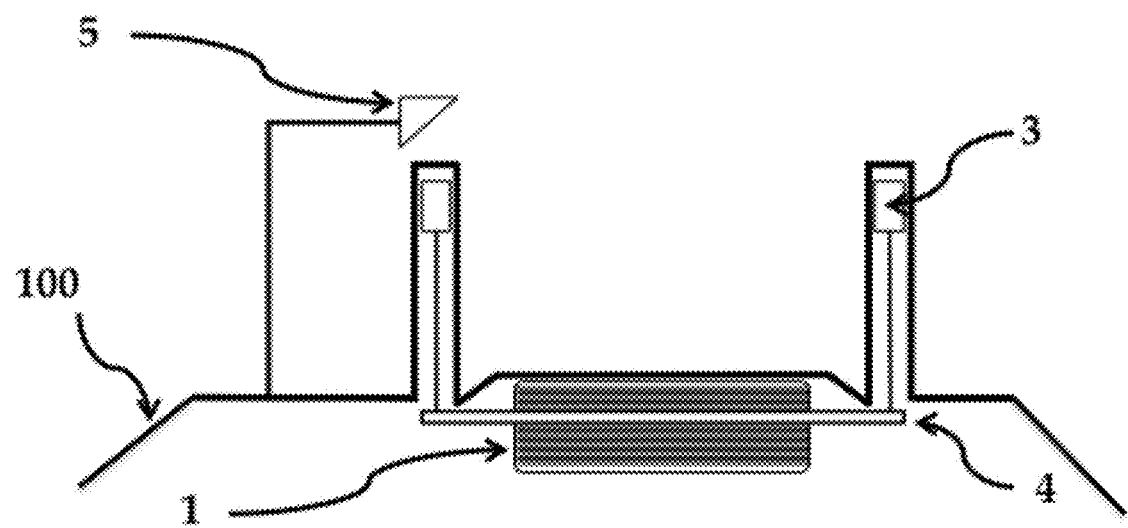
FIG. 2 is a cross section side view of the base of the preferred embodiment of the invention.
Figure 3:
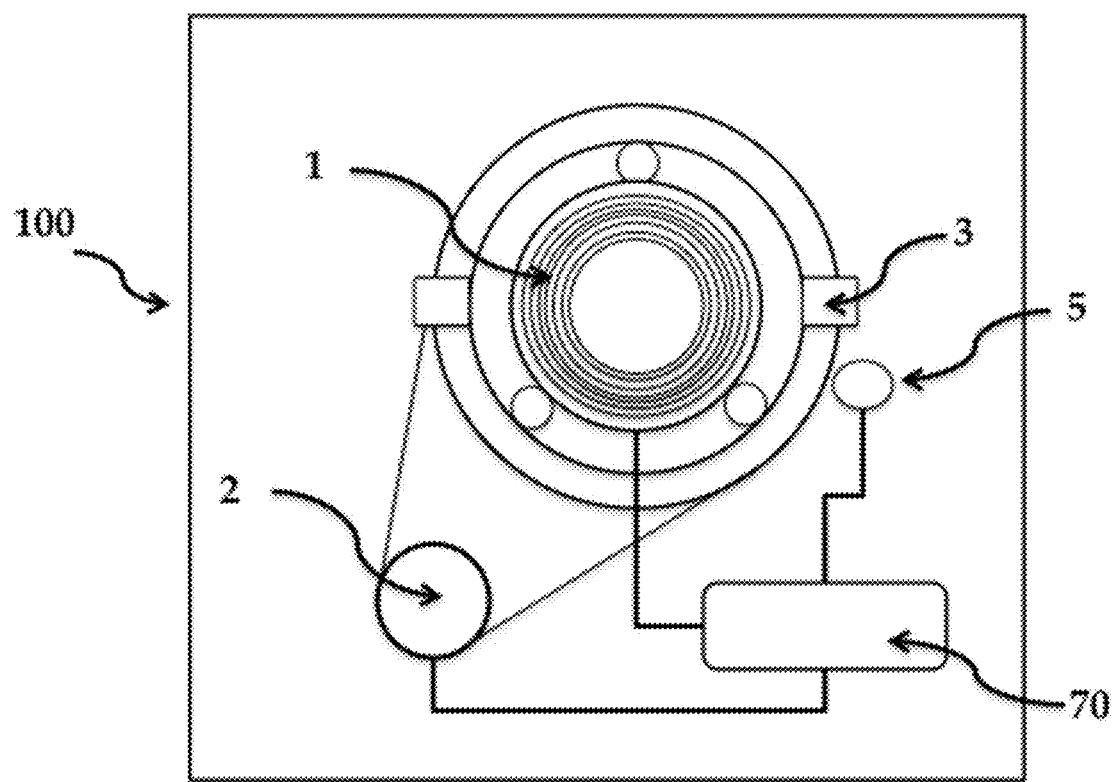
FIG. 3 is a top view of the rotating magnets and the induction heating element as shown in FIG. 2.

During the heating process, which may occur with or without stirring depending upon the phase of the brewing process, the temperature of the fluid contents may be measured. Depending on the type of temperature gauge, placement may be either to the side or above the carafe. FIGS. 1 and 2 show thermometer 5 placed adjacent to the location of carafe 8 as an example The thermometer 5 measures the temperature of the brewing coffee and if the temperature of the coffee is less than the desired temperature set by the operator, control circuit 70 activates heating element 1 and the coffee mixture is heated. Once the thermometer 5 measures that the desired temperature has been reached, control circuit 70 switches off the heating element until such time as it is needed again. This process continues until the brewing cycle is complete. At that point, a warm cycle may be activated which will perform similarly to the brew cycle except that the temperatures will generally be lower.

An excellent use of the invention is for making freshly brewed coffee from ground coffee beans. The invention may be employed to make other beverages such as tea, or may extract solids into butter, fats, or other oils or liquids, such as for flavoring the liquid.

While a particular embodiment has been disclosed in detail, it should be appreciated that many obvious changes may be made without departing from the basic concept of the invention of using temperature controlled heating and magnetic stirring to create a new way of brewing coffee, tea, or extracting solids into oils. While the stirrer 6 is the receptor of the induction heating, a heating receptor could be built into the base of the carafe 8 which would create the heating or a separate element could be added to the carafe 8. While we discuss a particular brew temperature and timer, many complex temperature curves and time restrictions could be integrated into the system for advanced brewing. While we discuss using induction heating as the primary heating method, we could also use infrared heating as our heating method. While we discuss the heating as being a binary on/off procedure, different currents could be used to vary the amount of heating in order to accurately hit the desired temperature. While we show a placement and an alternate placement of an IR thermometer, there are many ways to monitor and measure the temperature of inside of the carafe. While we use a spinning motion of the magnets, there are many motions such as back and forth motions found in washing machines which reverse and which can create an agitation useful for stirring inside of the carafe. While we include both a warm and brew cycle there are additional cycles or even the removal of a warm cycle to create either simple or more complex temperature controls. While we discuss having the spinning controlled by a simple on/off switch, there are many ways to implement more complex control over the time and the speed of the spin. Also, many particular ways to provide input to the machine to set particular temperature curves and timing paradigms are also natural including dials, knobs, switches, software applications, and wireless commands.

While certain novel features of the present invention have been shown and described, it will be understood that various omissions, substitutions and changes in the forms and details of the device illustrated and in its operation can be made by those skilled in the art without departing from the spirit of the invention.

I claim:

1. An extraction brewer for extracting solids into liquids comprising:
    a carafe capable of containing liquid contents, the carafe having a top and a bottom, with sides extending between the top and bottom, and a perimeter around the sides;
    a heating element located proximate to the bottom of the carafe;
    a magnet located proximate to, and outside of, the sides of the carafe, the magnet located between the bottom and the top of the carafe, the magnet capable of movement in a path around the perimeter of the carafe; and
    a stirrer capable of fitting inside the carafe, the stirrer comprising
        a base;
        an elongated riser with a first end attached to the base and a second end extending away from the base; and
        a block attached to the second end of the elongated riser, the block capable of being attracted to the magnet,
    where when the stirrer is inserted inside the carafe, the base rests upon the bottom of the carafe, and the block is located between the bottom and top of the carafe, proximate to the location of the magnet.

2. The extraction brewer of claim 1, further comprising:
    a thermometer capable of measuring a temperature of the liquid contents of the carafe.

3. The extraction brewer of claim 1, where the heating element is an induction heater and the base of the stirrer is a target of induction heating.

4. The extraction brewer of claim 1, where the heating element is an induction heater and the carafe further comprises a target of induction heating.

5. The extraction brewer of claim 1, where the heating element is an induction heater and where the extraction brewer further comprises a target of induction heating capable of being placed within the carafe.

6. The extraction brewer of claim 1, where the heating element is an infrared heating element and the base of the stirrer is a target of the infrared heating.

7. The extraction brewer of claim 1, where the heating element is an infrared heater and the carafe further comprises a target of infrared heating.

8. The extraction brewer of claim 1, where the heating element is an infrared heater and where the extraction brewer further comprises a target of infrared heating capable of being placed within the carafe.

9. The extraction brewer of claim 1, where the heating element is an infrared heater.

10. The extraction brewer of claim 1, where the stirrer is a component of the carafe.

11. The extraction brewer of claim 1, further comprising:
    a controller capable of controlling at least one of the heating element and rotation of the magnet.

12. The extraction brewer of claim 11, where the controller comprises a preset number of brewing options.

13. The extraction brewer of claim 11, where the controller may be controlled via a remote device.

14. The extraction brewer of claim 11, where the controller varies the speed of stirring over time.

15. The extraction brewer of claim 11, where the controller varies the temperature over time.

16. The extraction brewer of claim 1, where the magnet causes a non-circular motion of the stirrer.

17. An extraction mixer comprising:
    a carafe with an interior volume and an external surface, the interior volume capable of containing a liquid and a solid, the carafe having a bottom and sides;
    a heating element located proximate to the bottom of the carafe, the heating element capable of heating the liquid and the solid;
    a thermometer located proximate to the carafe, the thermometer capable of measuring the temperature of the liquid and the solid;
    a magnet capable of movement in a path around the external surface of the carafe, along the sides of the carafe;
    a motor capable of imparting rotational movement on the magnet;
    a stirrer capable of fitting inside the carafe, the stirrer comprised of:
        an area attracted to magnetic fields and which serves the purpose of being attracted to the magnet, creating a rotational movement of the stir rod, and
        an elongated riser attached to the area attracted to magnetic fields, the elongated riser elevating the area attracted to magnetic fields to a position above the heating surface; and
    a controller which takes input from both the thermometer and an operator to control the heating and stirring of the substances.

* * * * *